(12) United States Patent
Littau

(10) Patent No.: US 7,938,891 B2
(45) Date of Patent: May 10, 2011

(54) USING IONIC LIQUIDS

(75) Inventor: Karl Anthony Littau, Palo Alto, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 465 days.

(21) Appl. No.: 12/049,406

(22) Filed: Mar. 17, 2008

(65) Prior Publication Data
US 2009/0233155 A1 Sep. 17, 2009

(51) Int. Cl.
*B01D 53/22* (2006.01)
(52) U.S. Cl. .................. 96/5; 96/4; 96/8; 96/10; 96/11; 95/45; 95/51; 429/483; 429/498; 429/524; 429/532; 429/344
(58) Field of Classification Search .............. 95/45, 51, 95/230; 96/4, 5, 8, 10, 11; 429/480, 482, 429/483, 498, 499, 500, 523, 524, 532, 344
See application file for complete search history.

(56) References Cited

U.S. PATENT DOCUMENTS

| 3,511,712 | A |   | 5/1970  | Giner            |         |
|-----------|---|---|---------|------------------|---------|
| 3,676,220 | A | * | 7/1972  | Ward, III        | 204/277 |
| 4,002,493 | A |   | 1/1977  | Warszawski       |         |
| 4,117,079 | A |   | 9/1978  | Bellows          |         |
| 5,133,842 | A | * | 7/1992  | Taylor et al.    | 205/532 |
| 5,258,106 | A |   | 11/1993 | Habermann et al. |         |
| 5,358,556 | A | * | 10/1994 | Kaner et al.     | 95/45   |
| 5,472,585 | A |   | 12/1995 | Dinella et al.   |         |
| 5,597,863 | A |   | 1/1997  | Linder et al.    |         |
| 5,876,486 | A | * | 3/1999  | Steinwandel et al. | 95/44 |
| 6,579,343 | B2| * | 6/2003  | Brennecke et al. | 95/51   |
| 6,793,711 | B1| * | 9/2004  | Sammells         | 95/48   |
| 6,908,500 | B2| * | 6/2005  | Fisher et al.    | 96/6    |
| 2007/0119302 | A1 |  | 5/2007 | Radosz et al.   |         |
| 2008/0115667 | A1 | * | 5/2008 | Lee et al.      | 95/51   |
| 2009/0159456 | A1 |   | 6/2009 | Littau           |         |
| 2010/0005959 | A1 | * | 1/2010 | Littau et al.   | 95/51   |

FOREIGN PATENT DOCUMENTS

| EP | 1 935 476 A1 | 6/2008  |
| JP | 63049232     | 3/1988  |
| WO | WO 2004/104548 A2 | 12/2004 |
| WO | WO 2005/061422 A1 | 7/2005  |

OTHER PUBLICATIONS

Winnick, Jack et al., "An Electrochemical Device for Carbon Dioxide Concentration. 1. System Design and Performance", Ind. Eng. Chem. Process Des. Develop., vol. 13, No. 1, 1974, pp. 59-63.*

(Continued)

*Primary Examiner* — Jason M Greene
(74) *Attorney, Agent, or Firm* — Hollingsworth & Funk, LLC

(57) ABSTRACT

Carbon dioxide or other gases can be separated from gas streams using ionic liquid, such as in an electrochemical cell. For example, a membrane can contain sufficient ionic liquid to reduce ionic current density of at least one of protons and hydroxyl ions, relative to carbon-containing ionic current density. A gas stream containing carbon dioxide can be introduced on a cathode side, while a source of hydrogen gas can be introduced on the anode side of the membrane. Operation of an electrochemical cell with such a membrane can separate the carbon dioxide from the gas stream and provide it at a separate outlet.

20 Claims, 7 Drawing Sheets

OTHER PUBLICATIONS

Winnick, J., Marshall, R.D., and Schubert, F.H., "An Electrochemical Device for Carbon Dioxide Concentration. I. System Design and Performance," Ind. Eng. Chem., Process Des. Develop., vol. 13, No. 1, 1974, pp. 59-63.

Scovazzo, P., Poshusta, J., Dubois, D., Koval, C., and Noble, R., "Electrochemical Separation and Concentration of <1% Carbon Dioxide from Nitrogen," Journal of The Electrochemical Society, vol. 150, No. 5, 2003, pp. D91-D98.

Sugiura, K., Takei, K., Tanimoto, K., Miyazaki, Y., "The carbon dioxide concentrator by using MCFC," Jour. of Power Sources, vol. 118, 2003, pp. 218-227.

Lang, C.M., Kim, K., and Kohl, P.A., "High-Energy Density, Room-Temperature Carbonate Fuel Cell," Electrochemical and Solid-State Letters, vol. 9, No. 12, 2006, pp. A545-A548.

Susan, A.B.H., Kaneko, T., Noda, A., and Watanabe, M., Ion Gels Prepared by in Situ Radical Polymerization of Vinyl Monomers in an Ionic Liquid and Their Characterization as Polymer Electrolytes, J. Am. Chem. Soc. 2005, vol. 127, p. 4976-4983.

File History for U.S. Appl. No. 11/960,029 as retrieved from U.S. Patent and Trademark Office on Feb. 10, 2011, 113 pages.

File History for U.S. Appl. No. 12/168,953 as retrieved from U.S. Patent and Trademark Office on Feb. 10, 2011, 123 pages.

File History for U.S. Appl. No. 12/136,109 as retrieved from U.S. Patent and Trademark Office on Feb. 10, 2011, 125 pages.

File History for EP Application No. 09164825.3 as retrieved from European Patent Office Electronic File System on Feb. 10, 2011, 112 pages.

File History for EP Application No. 09161184.8 as retrieved from European Patent Office Electronic File System on Feb. 10, 2011, 97 pages.

Sata, "Studies on Anion Exchange Membranes Having Permselectivity for Specific Anions in Electrodialysis—Effect of Hydrophilicity of Anion Exchange Membranes on Permselectivity of Anions", Journal of Membrane Science, vol. 167, 2000, pp. 1-31.

* cited by examiner

USING IONIC LIQUIDS

FIELD OF THE INVENTION

The present invention relates generally to use of ionic liquids, such as to efficiently separate one gas from a mixture of gases.

BACKGROUND OF THE INVENTION

Various techniques have been proposed for the separation of carbon dioxide from gas mixtures. For example, Winnick, J., Marshall, R., and Schubert, F., "An Electrochemical Device for Carbon Dioxide Concentration. I. System Design and Performance," *Ind. Eng. Chem., Process Des. Develop.*, Vol. 13, No. 1, 1974, pp. 59-62 describes the use of electrochemical cells for carbon dioxide concentration. These and similar methods use electrochemical or "polarization membranes." These membranes operate on the principle that $CO_2$ is converted to soluble carbonates at high pH and is liberated again at low pH. A pH gradient is constructed across a semipermeable membrane. $CO_2$ is preferentially absorbed on the basic side and released on the acidic side.

U.S. Pat. No. 6,579,343 describes techniques for purifying gas by contacting the gas with a liquid ionic compound. Natural gas may be purified, removing water and carbon dioxide.

U.S. Patent Application Publication No. 2007/0119302 describes polymeric materials containing ionic groups, which can be used as membranes and sorbents for separating gas components, such as $CO_2$ from flue gas and natural gas. A polymer can have a polymeric backbone and ionic liquid moieties attached to the backbone.

It would be advantageous to have improved techniques for using ionic liquids such as in separating gases.

SUMMARY OF THE INVENTION

The invention provides various exemplary embodiments, including structures, articles, and methods. In general, the embodiments involve use of ionic liquids, for example, in separation of gases from a mixture of gases.

These and other features and advantages of exemplary embodiments of the invention are described below with reference to the accompanying drawings.

DETAILED DESCRIPTION

In the following detailed description, numeric values and ranges are provided for various aspects of the implementations described. These values and ranges are to be treated as examples only, and are not intended to limit the scope of the claims. In addition, a number of materials are identified as suitable for various facets of the implementations. These materials are to be treated as exemplary, and are not intended to limit the scope of the claims.

Many technical and industrial applications exist for gas separation, such as for carbon dioxide. Several examples include life support in closed environments such as spacecraft and submerged vehicles, sweetening of natural gas, and separation of carbon dioxide from power plant flue exhaust. In general, current gas separators used for these and similar applications are highly inefficient, consuming about 10 to 100 times the theoretical minimum energy required for such separation. The present methods of $CO_2$ separation expend about 250 to 2500 kJ or more of energy per mole of $CO_2$ separated. Current methods involve adsorbing $CO_2$ onto a material or reacting $CO_2$ with a solid or liquid under one set of operating conditions (such as high pressure and low temperature) and then isolating the solid or liquid and decreasing the pressure and/or increasing the temperature. While these methods have the advantages of simplicity and reliability, they are simply too inefficient for practical applications where the $CO_2$ concentration is low and the value of the gases is low, such as in air. Known methods, such as described in Winnick et al., are relatively inefficient as the ion diffusion tends to degrade the pH gradient over time. Additional energy is required to maintain the gradient.

Carbon dioxide is the main constituent of heat trapping gasses responsible for accelerated climate change. Methods for efficiently extracting $CO_2$ directly from the atmosphere could enable cost effective sequestration or conversion of $CO_2$ to hydrocarbons suitable for use as fuel while still being carbon neutral.

The exemplary implementations described below address the above problems in gas separation. They are especially useful in separating carbon dioxide.

Figure 1:
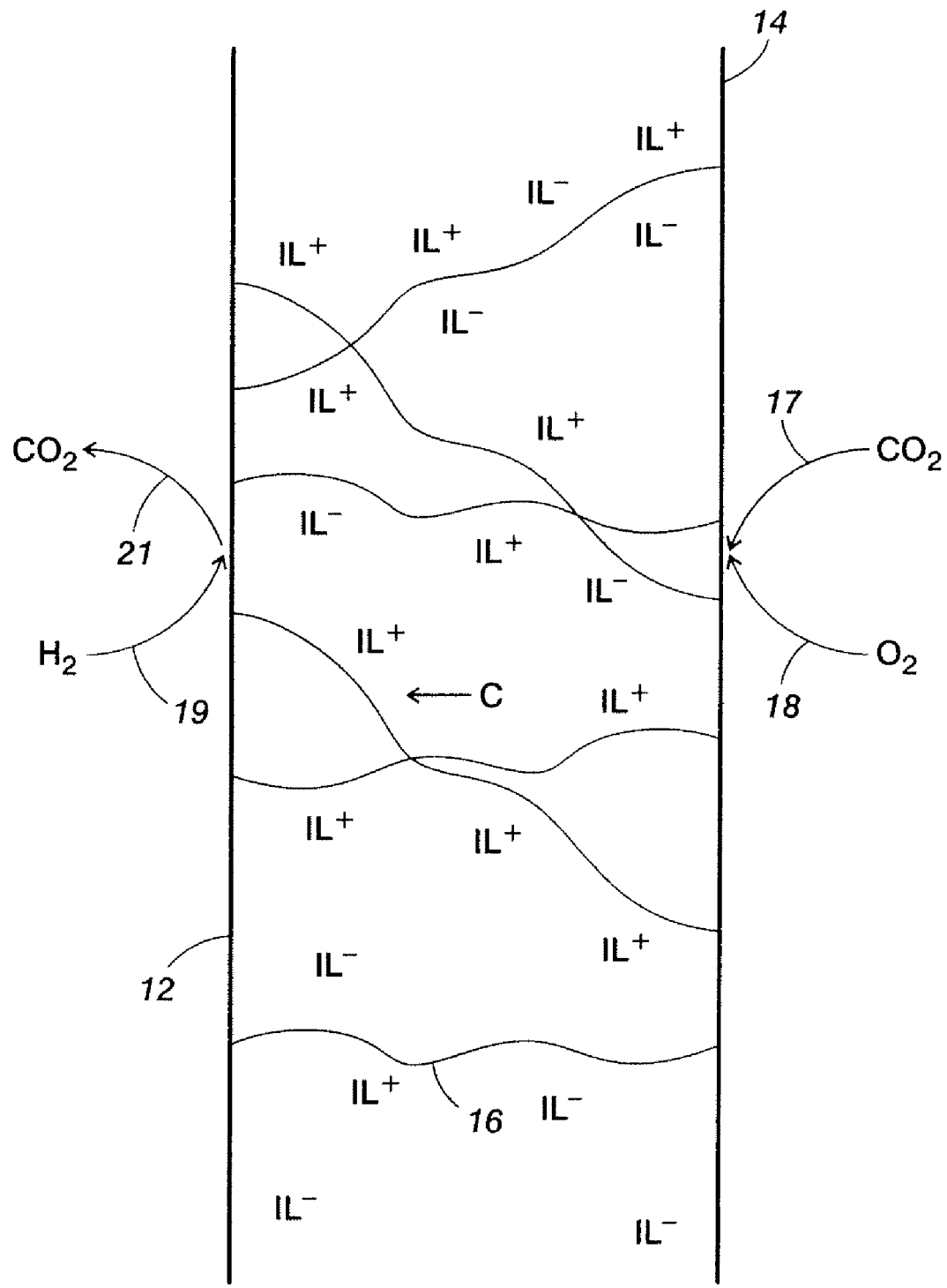
FIGS. 1-3 are schematic views of the flow of molecules and ions in separating carbon dioxide, such as within an electrochemical cell.

FIG. 1 shows anode 12 and cathode 14 which can, for example, be in an electrochemical cell. The side of the cell with the cathode 14 is configured as the basic side of the cell, while the side with the anode 12 is configured as the acidic side of the cell. A gas, such as air, containing both $CO_2$ (per arrow 17) and $O_2$ (per arrow 18) is introduced at the cathode 14. In the region between anode 12 and cathode 14, ionic liquids $IL^+$ and $IL^-$ (depending on whether the particular ions in that region are cations or anions) move about a support structure 16. Support structure 16 may be a porous membrane or similar material, such as cellulose.

While FIG. 1 shows hydrogen gas as the fuel for the reactions, any hydrogen-containing molecule may be used that, when consumed at the anode, produces protons. Examples of such materials include methanol and other alcohols, metal hydrides, and methane or other simple hydrocarbon compounds.

The ionic liquids used with the implementations described herein in general are room temperature ionic liquids, that is, ionic liquids that are in liquid form at room temperature. While such room temperature ionic liquids have demonstrated utility with the implementations described herein, those of ordinary skill in the art may recognize other ionic liquids that are not necessarily room temperature ionic liquids that may also be useful. Room temperature ionic liquids have negligible vapor pressure and are good ionic conductors. They require little moisture to be functional and many are naturally hygroscopic. Functionalizing room temperature ionic liquids with appropriate buffering or charged groups and optionally binding them to a matrix enables the liquids to have appropriate anion specific conductance and reduced hydroxyl diffusion. In this way, they may be used to promote carbon dioxide transport.

Ionic liquids useful in the implementations described herein include those that have a low viscosity below about 50 cps and are at least partly miscible with water. Examples of useful ionic liquids include those formed from 1-butyl-1-methylpyrrolidinium dicyanamide, 1-ethyl-3-methylimidazolium trifluoromethanesulfonate, N-butyl-3-methylpyridinium dicyanamide, 1-butyl-3-methylimidazolium dicyanamide, 1-ethyl-3-methylimidazolium thiocyanate, 1-ethyl-3-methylimidazolium trifluoroacetate, and the like, including liquid ionic compounds described in U.S. Pat. No. 6,579,343, incorporated herein by reference. Ionic liquids containing dissolved Group I and Group II carbonate or bicarbonate salts would be particularly useful in carbon dioxide separation. Other soluble carbonate salts would also be useful in such an implementation. 1-Butyl-3-methylimidazolium tricyanomethane is partially miscible in water and may be useful; 1-Butyl-1-methylpyrrolidinium bis(trifluoromethylsulfonyl)imide has a viscosity of about 70 cps and may also be useful with the implementations described herein. In certain embodiments, the ionic liquids may be hygroscopic. The ionic liquids are generally electrochemically stable at the potentials typical in an electrochemical $CO_2$ concentrator.

In FIG. 1, on the basic side at the cathode, $O_2$ reacts with $H_2O$ and $2e^-$ to form $OH^-$, and $CO_2$ reacts with $OH^-$ to form a carbon-containing ion, represented by C. C can be any carbon-containing constituent known to those of ordinary skill in the art, such as carbonate or bicarbonate ion.

For $CO_2$ separation, C will typically be carbonate or bicarbonate ion; $CO_2$ may react with other species to produce other carbon-containing ions. Hydrogen gas (per arrow 19) is fed to the cell at the anode 12 where it forms $H^+$ and $e^-$. The carbon-containing ion C travels or transports across the cell to the acidic side at the anode 12 where it reacts with $H^+$ to form $CO_2$ again. The newly formed $CO_2$ (per arrow 21) is liberated at the anode 12. For example, the reactions may be characterized as follows:

| Anode: | Cathode: |
|---|---|
| $H_2 \rightarrow 2H^+ + 2e^-$ | $\frac{1}{2}O_2 + H_2O + 2e^- \rightarrow 2OH^-$ |
| $HCO_3^- + H^+ \rightarrow H_2O + CO_2$ | $CO_2 + OH^- \rightarrow HCO_3^-$ |

The cathodic and anodic reactions rely on the differential solubility of $CO_2$ and $CO_2$-related carbon-containing species at different pH levels and operate independently of electrode potential. Without the ionic liquid, $H^+$ and $OH^-$ tend to diffuse across the cell. The membrane includes sufficient ionic liquid to selectively reduce $H^+$ and $OH^-$ ionic current density, relative to the ionic current density of the carbon-containing ions. The ions that are transported across the cell complete the circuit between the anode and the cathode. The relative ionic current density of the various species can be measured at each electrode to determine the relative current density of each. It is thus believed to reduce diffusion of $H^+$ and $OH^-$ across the cell, while permitting or promoting carbon-containing ion transport. This can be confirmed by measuring Faradaic efficiency, as described below for example.

Figure 2:
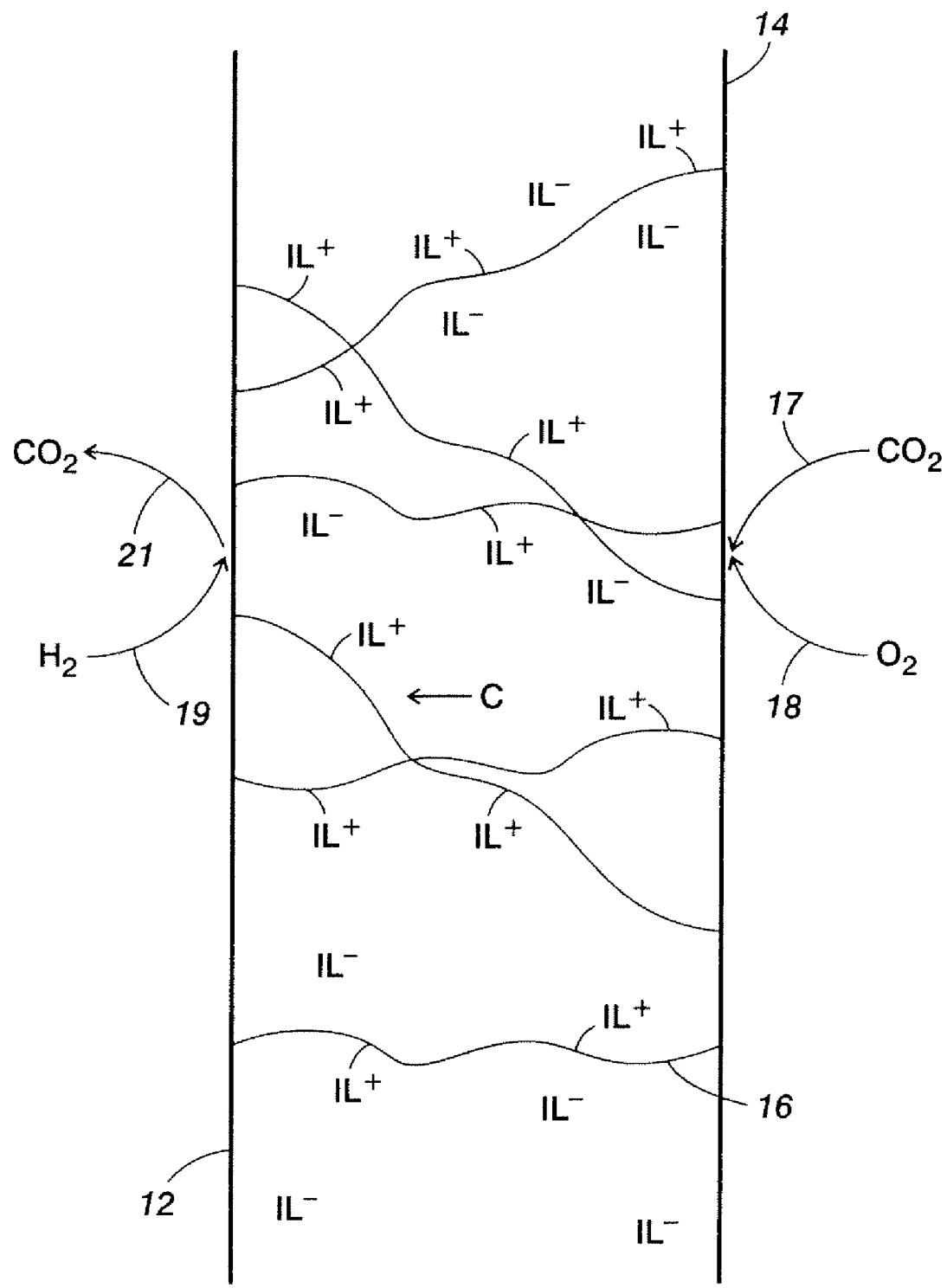

FIG. 2 shows an implementation wherein the cations $IL^+$ are immobilized. The immobilized ionic liquid is held within a particular region or layer by immobilization to a support 16. Although the ionic liquid is shown in FIG. 1 with cations $IL^+$ attached to the support 16 and anions $IL^-$ free to move, in some applications the configuration may be reversed with the anions held in place and the cations free to move. The ionic liquid may be partially or completely immobilized. The system can be designed to configure the immobilization as desired for the particular circumstances. For example, the immobilization may be by charge (as shown in FIG. 2) or by the size of the ions, such as when larger ions are immobilized and smaller ions are free to move, or some other way known to those of skill in the art.

In FIG. 2, the cations $IL^+$ are shown covalently bonded to the support 16. To achieve this implementation, the system would be designed so that the cations $IL^+$ react with the support 16. Such systems could be configured, for example, using techniques as described in U.S. Patent Application Publication No. 2007/0119302, incorporated herein by reference. Other examples of such reactions include photo-induced cross-linking of the ions with the support 16 or reactions of an amine group with a carboxylic acid.

Similar to FIG. 1, FIG. 2 shows a gas, such as air, containing both $CO_2$ (per arrow 17) and $O_2$ (per arrow 18) that is introduced at the cathode 14. In the region between anode 12 and cathode 14, cations $IL^+$ are bonded to the support structure 16. For $CO_2$ separation, C will typically be carbonate or bicarbonate ion; $CO_2$ may react with other species to produce other carbon-containing ions. Hydrogen gas (per arrow 19) is fed to the cell at the anode 12 where it forms $H^+$ and $e^-$. The carbon-containing ion C travels across the cell to the acidic side at the anode 12 where it reacts with $H^+$ to form $CO_2$ again. The newly formed $CO_2$ (per arrow 21) is liberated at the anode 12.

Figure 3:
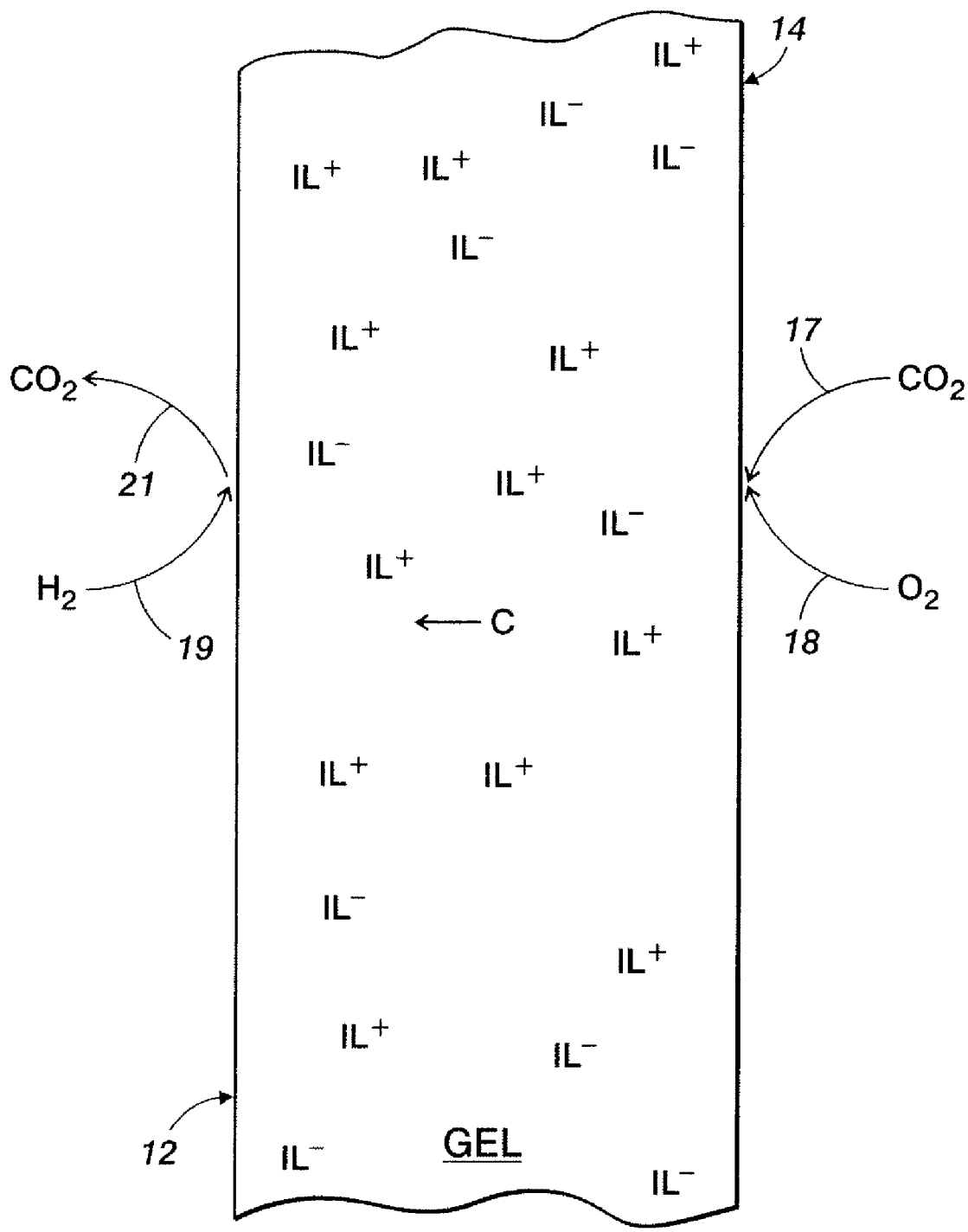

FIG. 3 shows another implementation of a system having immobilized ionic liquid. In this implementation, a gel may be used to provide complete or partial immobilization of the ionic liquid. Generally, the gel does not react with the ionic liquid, but instead may immobilize the ions based on size. Larger ions are held in place, while smaller ions are free to move about the system. If all of the ions are large, all ions of the ionic liquid may be held in place. Typically, the carbon-containing ion is free to move within the system to achieve the desired gas separation. It is believed that, with sufficient ionic liquid, a gel as in FIG. 3 would reduce proton or hydroxyl ion current density, and thus diffusion across the cell, relative to carbon-containing ion current. It is common that the cations of an ionic liquid are much larger than the anions. In such a case, the cations could be selectively immobilized based on their larger size rather than their positive charge directly. The membrane would have the character of both ionic liquid and ion exchange, similar to an anion exchange membrane.

The gel may be implemented in a number of different ways. One method would be to cast a membrane using a formulation that contains the ionic liquid. Another alternative would be to penetrate a matrix with a monomer mixture that includes ionic liquid. For example, a monomer mixture of acrylamide and Immobiline™ monomers could penetrate a cellulose matrix and the matrix could then be cured to immobilize the matrix.

Similar to FIGS. 1-2, FIG. 3 shows a gas, such as air, containing both $CO_2$ (per arrow 17) and $O_2$ (per arrow 18) is introduced at the cathode 14. In the region between anode 12 and cathode 14, ionic liquid $IL^+$ and $IL^-$ are immobilized within the gel. For $CO_2$ separation, C will typically be carbonate or bicarbonate ion; $CO_2$ may react with other species to produce other carbon-containing ions. Hydrogen gas (per arrow 19) is fed to the cell at the anode 12 where it forms $H^+$ and $e^-$. The carbon-containing ion C travels across the cell to the acidic side at the anode 12 where it reacts with $H^+$ to form $CO_2$ again. The newly formed $CO_2$ (per arrow 21) is liberated at the anode 12.

Figure 4:
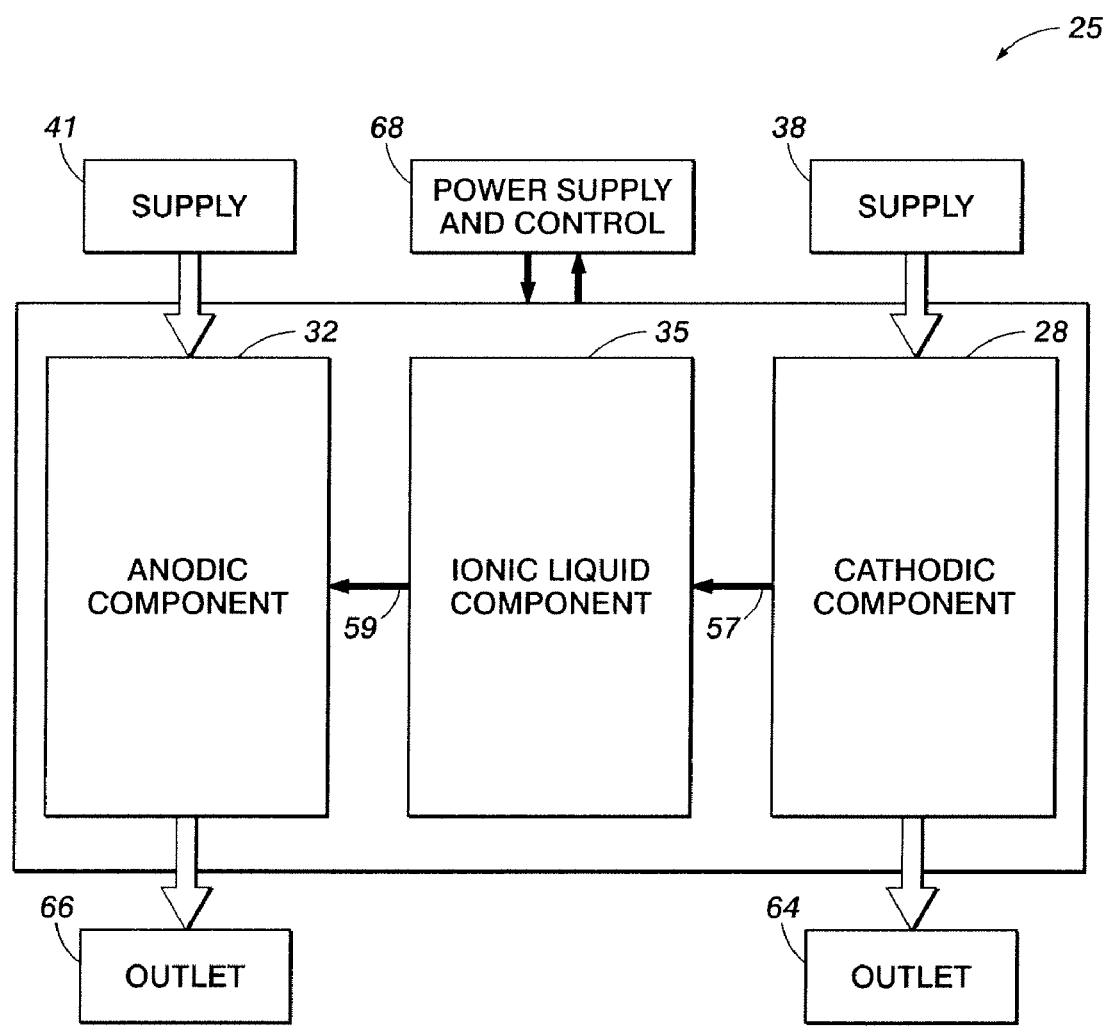
FIG. 4 is a schematic block diagram of a system in which molecules and ions can flow as in FIGS. 1-3.

FIG. 4 shows system 25 in which ionic liquid component 35 selectively reduces $H^+$ and $OH^-$ ionic current density across the cell, relative to carbon-containing ionic current density. It is thus believed that the ionic liquid component 35 reduces H$^+$ and OH$^-$ transport, while permitting or promoting carbon-containing ion transport. System 25 includes supply 38 and outlet 64 at cathodic component 28 and supply 41 and outlet 66 at anodic component 32. In operation, a gas that includes carbon dioxide is introduced to cathodic component 28 from supply 38, while hydrogen gas is introduced to anodic component 32 from supply 41. The gas with reduced carbon dioxide content is released from cathodic component 28 through outlet 64. Carbon-containing ions transfer from cathodic component 28 to ionic liquid component 35 as shown by arrow 57, and from ionic liquid component 35 to anodic component 32 as shown by arrow 59. The carbon-containing ions react at anodic component 32 to form carbon dioxide gas that exits system 25 through outlet 66. In a typical embodiment, system 25 also includes load and control 68 to provide electrical load across components 28 and 32 and to control any other electrical components, such as valves, pumps, and so forth.

Ionic liquid component 35 includes ions that are configured, such as in one of the ways described above, to promote the reactions in the system for the separation of carbon dioxide, so that the reactions are more efficient than if the ionic liquid was absent. In some implementations, the ions can be immobilized on a matrix or other structure by bonding or the like. The ionic liquid component 35 should contain sufficient ionic liquid to permit carbon-containing ion diffusion or transport while reducing ionic current density of protons and hydroxyl ions relative to the current density of carbon-containing ions. Thus, the ionic liquid is believed to reduce diffusion of protons and hydroxyl ions.

Figure 5:
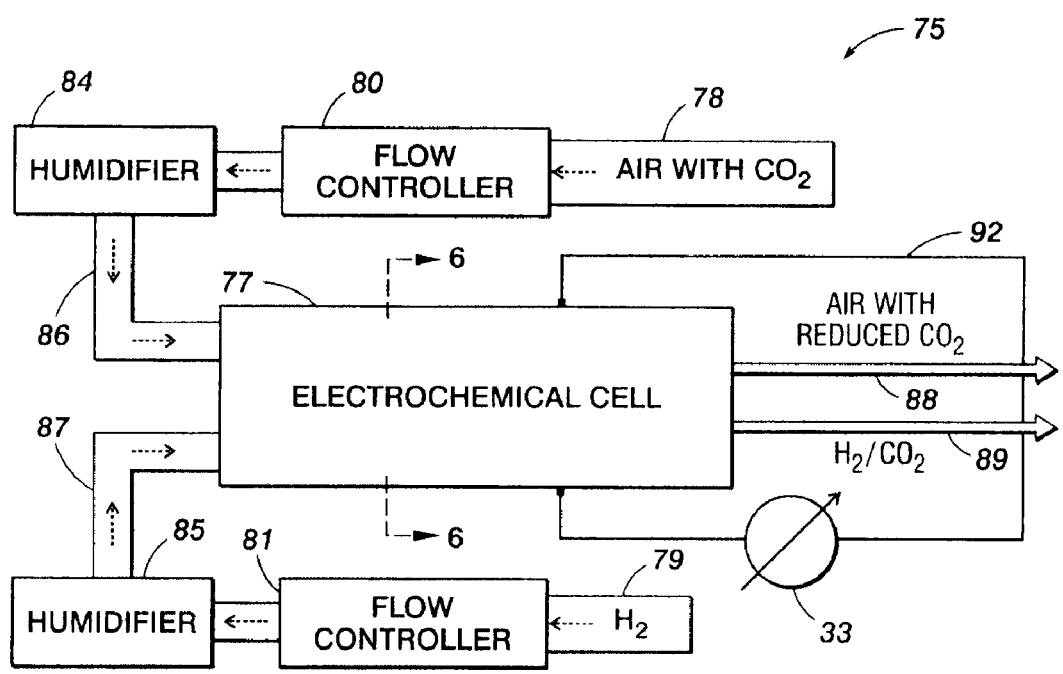
FIG. 5 is a schematic view showing flow paths of gases in a system as in FIG. 4.

FIG. 5 shows system 75, an exemplary implementation of system 25 in FIG. 4. In this implementation, air containing carbon dioxide flows through tube 78. Although FIG. 5 shows the inlet gas being air, other gases containing carbon dioxide could also be used, such as exhausts from industrial processes. On the other side, hydrogen gas flows into the system 75 through tube 79. Each gas stream flows through a respective flow controller 80 or 81 and, optionally, through a respective humidifier 84 or 85 that controls the relative humidity of the gas stream. Ionic liquid systems do not require a great deal of humidity to function efficiently. Thus, the humidification step is optional. From there, the humidified gas streams flow in parallel through respective tubes 86 and 87 into electrochemical cell 77 where the carbon dioxide is separated from the air. Two outlets 88 and 89 are shown from system 75. Reduced carbon dioxide air flows through one outlet 88, while carbon dioxide and excess hydrogen that is not consumed during the process flow out through the other outlet 89. Variable load 33 is attached to electrochemical cell 77 to form circuit 92 that controls the power to electrochemical cell 77. In operation, load 33 to circuit 92, regulates the extent to which H$_2$ is permitted to generate an electrical circuit within electrochemical cell 77. Variable load 33 may be a battery or other energy storage or conversion device. In this case, variable load 33 is being charged rather than discharged.

Figure 6:
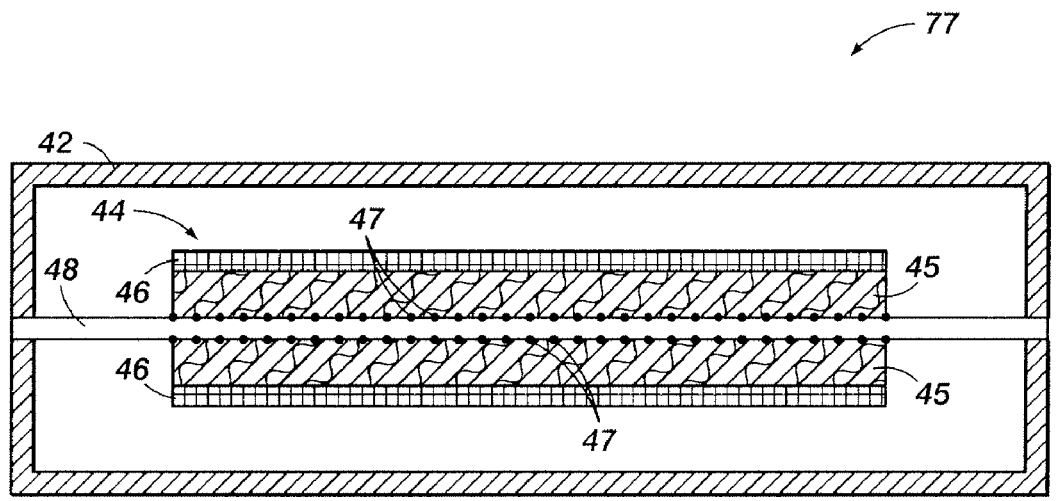
FIG. 6 is a cross-sectional view of the electrochemical cell as in FIG. 5 taken along line 44 of FIG. 5.

FIG. 6 shows a cross-section of electrochemical cell 77, an exemplary implementation of cell 77 in FIG. 5. Layered structure 44 is shown within enclosure 42 that can be metal or similar material.

Membrane 48 that includes ionic liquid is clamped or otherwise fixed in place within the enclosure 42 with tubes 86 and 88 connected on one side of membrane 48 and tubes 87 and 89 connected on the other, the tubes being shown in FIG. 5. The membrane may be a polymer, porous cellulose, expanded polytetrafluoroethylene, glass fibers, or other porous materials.

Catalyst layers 47 formed of platinum particles or other material known to those of ordinary skill in the art are located on either side of membrane 48. Examples of other catalyst materials include nickel and palladium. The catalyst layers increase the efficiency of the system by increasing the amount of H$^+$ and OH$^-$ within the system. The catalyst increases the rate of the fuel reaction of H$_2 \rightarrow$ 2H$^+$+2e$^-$. Any material known or discovered to increase the rate of this reaction may be used as the catalyst. The catalyst layers 47 may be applied by painting, air brushing, or printing.

Gas diffusion layers 45 are located on either side of membrane 48 and catalyst layers 47. The gas diffusion layers permit the gases to diffuse through the pores therein from each of porous conductive layers 46 (described below) to membrane 48. The gas diffusion layers can be formed of a porous electrically conductive material such as carbon paper or carbon cloth and may be infused with a polymer, such as polytetrafluoroethylene (PTFE) in order to help prevent excess water accumulation in the gas diffusion layer.

The reactions that form the carbon-containing ion on the cathode side and for re-forming carbon dioxide gas on the anode side take place at the interface of the gas diffusion layers and the membrane. These reactions do not require the presence of the catalyst or any external applied potential. The platinum catalyst increases the efficiency of the hydrogen-containing molecule and oxygen gas consumption. Carbon-containing ion formation can be aided by the presence of other catalysts including both enzymatic catalysts, such as carbonic anhydrase, or inorganic catalysts. Either layers of porous conductor material 46 or a metal plate acting as a flow field (described below) are located on either side of the gas diffusion layers 45. The porous conductors can be formed of a material that conducts electricity and permits gas diffusion, such as a wire mesh, expanded metal, or similar material.

A metal plate with machined gas channels acting as a "flow field", such as are commonly used in fuel cells, may also be used in place of the porous conductor material 46. For example, a flat plate of stainless steel with machined grooves having an inlet at one end and outlet at the other may be used. The grooved surface is placed against the gas diffusion layer defining channels where the gas passes over the gas diffusion layer. This is commonly referred to as the "flow field" in fuel cell art.

As reactions progress at catalyst layers 47, the interfaces of the catalyst layers 47 with the gas diffusion layer 45 and membrane 48 behave similarly to electrodes, with one behaving like a cathode and the other like an anode. In operation, an electric field is therefore formed across membrane 48 between catalyst layers 47 at the interfaces of gas diffusion layers 45 and membrane 48.

Membrane 48 can be implemented by immobilizing ionic liquid in a suitable structure or by simply soaking membrane 48 in an ionic liquid. Sufficient amount of ionic liquid should be used within membrane 48 to permit transport of carbon-containing ions while reducing relative ionic density of protons and hydroxyl ions. In this way, the ionic liquid is believed to reduce diffusion of protons and hydroxyl ions in the system. The ionic liquid also needs to fill all the pores of the matrix sufficiently to prevent direct gas transport through the pores. For example, ionic liquids can be immobilized by fixing them to a structure such as a polymer, matrix, or other permeable or semi-permeable membrane, including as an example ion exchange membranes using techniques similar to those disclosed in U.S. patent application Ser. No. 11/960, 029, filed Dec. 19, 2007, the contents of which are incorporated herein by reference. The ion exchange membrane described in the '029 application could also be soaked in ionic liquid in a further implementation. The ionic liquid keeps the membrane moist and prevents it from drying out.

Figure 7:
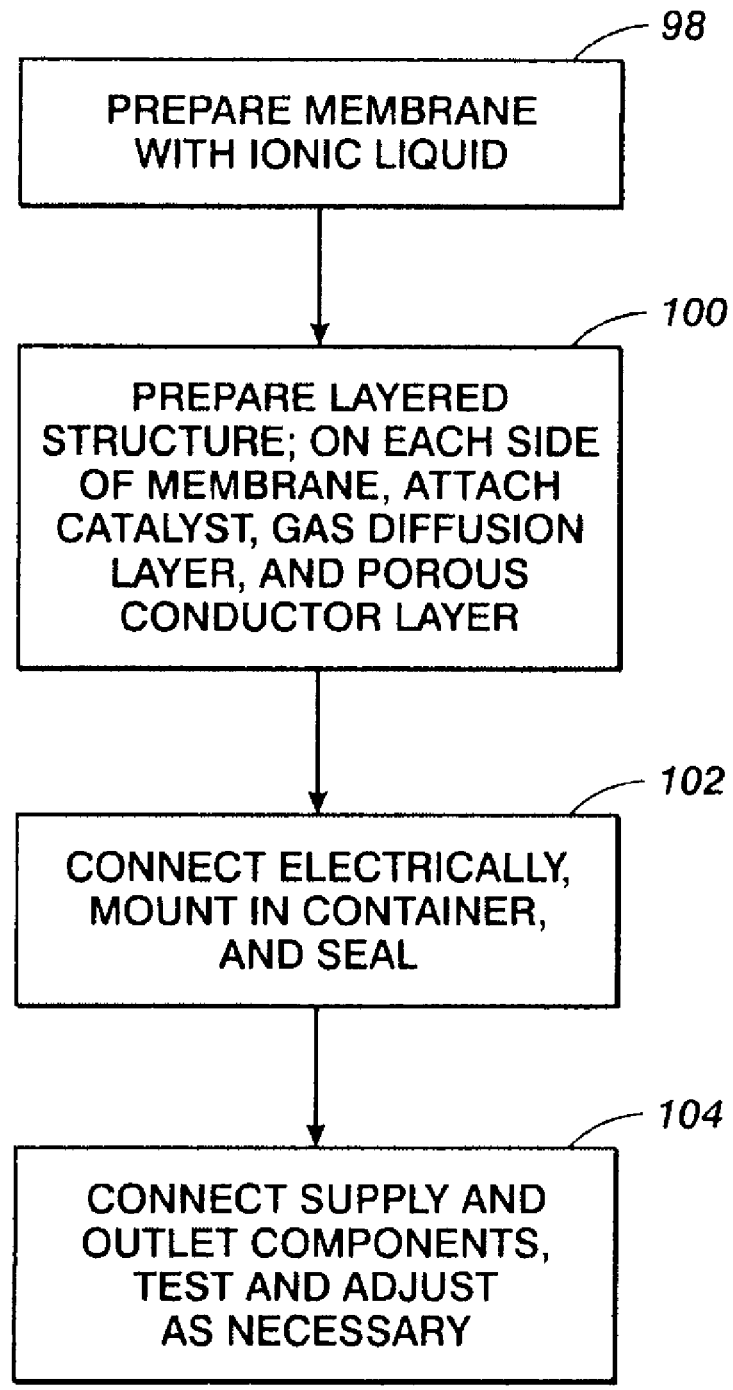
FIG. 7 is a block diagram showing a process for producing a system as in FIGS. 5 and 6.

FIG. 7 shows exemplary steps that can produce a system like those disclosed herein. In the operations in box 98, membranes that include ionic liquids are formed. The ionic liquid may be immobilized in a membrane, such as a matrix or matrix layer, or the membrane may simply be soaked in the ionic liquid. Other methods of saturating the membrane with ionic liquid could also be used. In the operation in box 100, a layered structure can be prepared from a membrane. On each side of the membrane, the catalyst, gas diffusion layer, and porous conductor layer are attached. In the operations in box 102, the system is connected electrically, mounted in a container, and sealed. Finally, in an operation in box 104, the supply and outlet components are connected. The system can be tested and adjusted as necessary.

The particular order of any of the steps for preparing the various components of the system is not critical. Indeed, they can be performed in any appropriate order. For example, in FIG. 6, although the layered structure 44 is described as being prepared as a catalyst layer 47 covering the membrane 48, it could just as easily be constructed as the catalyst layer 47 covering the gas diffusion layer 45 which is then attached to the membrane 48. The catalyst layer 47 need not be present as a complete layer at all, but must simply be present in sufficient quantity and thickness to facilitate the desired chemical reactions.

If necessary or desirable, the system can easily be designed to permit control of the temperature and pressure of the various gases as they move throughout. A gas analyzer may be used to test the various outlet gases to determine whether the system is operating as desired. The outlet gases may be used in any application desired. The outlet gases may be pumped to another location or used in reactions or other applications nearby.

EXAMPLE

A membrane using 1-butyl-1-methylpyrrolidinium dicyanamide as the ionic liquid saturated with $Cs_2CO_3$ (Cesium carbonate) was prepared. This liquid was supported on a cellulose membrane having a thickness of 400 μm. Faradaic efficiencies of 15% to 20% were observed at a current density of 1 $mA/cm^2$ and an input concentration of 400 ppm $CO_2$ in air. The total flow rate through the system was 1.5 slm on the air side and 70 sccm $H_2$ on the hydrogen side. The total active membrane area was 50 $cm^2$. Platinum on carbon paper was used for the gas diffusion electrodes.

Faradaic efficiency is a measure of how effectively electrical current in the electrochemical cell is used. High Faradaic efficiencies suggest that the process requires lower electrical current to complete the reaction making the process more feasible. In this case, Faradaic efficiency is a measure of the ratio of $CO_2$ capture rate over the electric current through the system. A Faradaic efficiency of 100% means exactly one $CO_2$ molecule is captured for every electron passing through the system (one hydrogen molecule makes two electrons).

As used herein, the term "matrix" refers to a polymer, resin, or other material structured so that it can support ionic liquid. For example, cations or anions of the ionic liquid may be bonded to or within a matrix.

As used herein, the term "ionic liquid" refers to a liquid that contains essentially only ions. The term "room temperature ionic liquid" generally refers to salts having a melting point below about 100° C., such that they are generally in liquid form at room temperature.

To "immobilize" an ionic liquid means to keep the ions in place relative to movable ions and molecules around it, i.e., to prevent them from moving as the ions and molecules move. Cations or anions may be immobilized separately, while the counter-ions are free to move. Immobilization may also be implemented by size of the ions with large ions immobilized and small ions free to move. Immobilizing does not refer to complete lack of movement, but to reducing movement measurably from its level without any immobilization. For example, there may still be a small amount of movement of the layers and thus of the ions within the cell. Immobilizing the ionic liquid may be accomplished by bonding or fixing the ions such as to a matrix or similar structure or by confining them within a relatively small region at a structure.

As used herein, a "layer" is a thickness of material, whether or not patterned in any way. A layer "includes" a specified type of material if material of the specified type is present in any part of the layer; a layer is "of" a specified type of material if material of the specified type is predominant throughout the layer. A layer may be homogeneous or its composition or characteristics may vary. A layer may include two or more layers or parts of layers within it, sometimes referred to as "sublayers". An "insulating layer" is a layer that is electrically insulating, while a "conductive layer" is a layer that is electrically conductive.

A "layered structure" refers herein to a structure that includes layers.

The term "membrane" refers to a structure that is permeable to fluids, such as gas, liquid, or aerosol. A membrane may be "semipermeable" meaning that it is permeable to some substances and impermeable to others. A membrane may include one or more layers of matrix.

The term "gel" refers to a fibrous and/or cross-linked material (usually polymeric) which includes a substantial fraction of water or other solvent immobilized within the matrix.

The terms "cathodic component" and "anodic component" refer, respectively, to structures or materials that act as electrodes and from which positive or negative electric current flows. A "cathodic component" can include an area in which reduction occurs, while an "anodic component" can include an area in which oxidation occurs.

The term "electrochemical cell" refers to a vessel that produces a voltage by the releasing and accepting of electrons from chemical reactions taking place therein.

"Carbon-containing ions" simply refer to ions that contain the element carbon. They may be anions or cations with the ionization occurring on the carbon atom or on another atom within the ion.

The term "ionic current density" refers to the total net charge transported by ions across a surface per unit area and time. For example, if $6.24 \times 10^{18}$ carbonate atoms (one coulomb) were transported across a membrane of 1 $cm^2$ in one second and each carbonate ion carried a −2 charge, the ionic current density would be 2 $Amps/cm^2$.

Although the invention has been described herein primarily for the separation of carbon dioxide from other gases, the invention is not so limited. As understood by those of ordinary skill in the art, the system described could be used to separate other gases.

While the invention has been described in conjunction with specific exemplary implementations, it is evident to those skilled in the art that many alternatives, modifications, and variations will be apparent in light of the foregoing description. Accordingly, the invention is intended to embrace all other such alternatives, modifications, and variations that fall within the spirit and scope of the appended claims.

What is claimed is:

1. A system to separate carbon dioxide from a gas stream comprising:
   a cathodic component and an anodic component with a region between them and structured such that, with oxygen and carbon dioxide at the cathodic component and hydrogen-containing molecules that can provide protons at the anodic component, reactions occur producing carbon-containing ions; the carbon-containing ions transporting from the cathodic component to the anodic component and reacting at the anodic component to form carbon dioxide; and
   an ionic liquid component in the region between the cathodic component and the anodic component, the ionic liquid component including sufficient ionic liquid to permit the transport of the carbon-containing ions between the cathodic component and the anodic component while reducing ionic current density of at least one of protons between the anodic component and the cathodic component and hydroxyl ions between the cathodic component and the anodic component, relative to ionic current density of the carbon-containing ions.

2. The system of claim 1, wherein the ionic liquid is within a membrane.

3. The system of claim 1, wherein the ionic liquid component includes a layered structure between the cathodic component and the anodic component that includes the ionic liquid.

4. The system of claim 1, wherein the ionic liquid contains carbonate or bicarbonate salts.

5. The system of claim 1, wherein the ionic liquid is at least partially miscible with water.

6. The system of claim 1, wherein the ionic liquid has a viscosity of less than about 50 cps.

7. A method of separating carbon dioxide from a gas, the method comprises:
   reacting the gas at a cathode to form carbon-containing ions;
   transporting the carbon-containing ions through a region between the cathode and an anode, the region including ionic liquid; and
   reacting the carbon-containing ions at the anode to form carbon dioxide;
   wherein the ionic liquid is sufficient to reduce the ionic current density of at least one of protons between the anode and the cathode and hydroxyl ions between the cathode and the anode, relative to ionic current density of the carbon-containing ions.

8. A method of separating carbon dioxide from a gas, the method comprises:
   reacting a gas that includes carbon dioxide with hydroxyl ions or water to produce carbon-containing ions;
   transporting the carbon-containing ions through a membrane that includes sufficient ionic liquid to reduce ionic current density of at least one of protons and hydroxyl ions, relative to ionic current density of the carbon-containing ions; and
   reacting the carbon-containing ions after transport through the membrane to provide carbon dioxide.

9. The method of claim 8, wherein the reaction of the gas that includes carbon dioxide occurs on a first side of a membrane and the reaction of the carbon-containing ions occurs on a second side of a membrane; the method further comprising supplying oxygen gas to the first side of the membrane and hydrogen gas to the second side of the membrane.

10. The method of claim 8, wherein the act of reacting the gas that includes carbon dioxide comprises reacting carbon dioxide to produce carbonate or bicarbonate ions.

11. The method of claim 10, wherein the act of reacting the carbon-containing ions comprises reacting the carbonate or bicarbonate ions to produce carbon dioxide.

12. An electrochemical cell comprising:
   a cathodic component and an anodic component with a region between them and structured such that, with oxygen and carbon dioxide at the cathodic component and hydrogen-containing molecules that can provide protons at the anodic component, reactions occur producing carbon-containing ions; the carbon-containing ions transporting from the cathodic component to the anodic component and reacting at the anodic component to form carbon dioxide; and
   a membrane component that includes ionic liquid between the cathodic component and the anodic component, the ionic liquid being sufficient to permit the transport of the carbon-containing ions between the cathodic component and the anodic component while reducing ionic current density of at least one of protons between the anodic component and the cathodic component and hydroxyl ions between the cathodic component and the anodic component, relative to ionic current density of the carbon-containing ions.

13. The electrochemical cell of claim 12, wherein the immobilized ionic liquid component includes a layered structure and the anodic and cathodic components are on opposite sides of the layered structure.

14. The electrochemical cell of claim 13, wherein the layered structure includes:
   a membrane with first and second opposing sides, the ionic liquid being within the membrane;
   catalyst on the first and second opposing sides;
   first and second electrically conductive structures over the first and second catalyst layers, each electrically conductive structure being electrically connectable to a load and permitting gas diffusion to the catalyst.

15. The cell of claim 14, wherein:
   the ionic liquid contains carbonate or bicarbonate salts;
   the catalyst comprises platinum; and
   the electrically conductive structures are formed of either a metal plate or wire mesh and include layers formed of carbon paper infused with polytetrafluoroethylene.

16. An article of manufacture comprising:
   a membrane that includes:
   a permeable support layer with first and second opposing surfaces and one or more ionic liquids within the support layer, the ionic liquids sufficient to reduce diffusion of at least one of protons and hydroxyl ions;
   first and second catalyst layers on the first and second opposing surfaces, respectively; and
   first and second electrically conductive structures over the first and second catalyst layers, respectively, each electrically conductive structure being electrically connectable to a load and permitting gas diffusion to the catalyst layers.

17. The article of claim 16, further comprising circuitry to connect the first and second electrically conductive structures to the load.

18. The article of claim 16, wherein the first catalyst layer and the first electrically conductive structure comprise an anodic component and the second catalyst layer and the second electrically conductive structure comprise a cathodic component.

19. The article of claim 17, further comprising an enclosure within which the membrane is sealed.

20. The article of claim 19, and further comprising:
a source of gas containing carbon dioxide and an outlet for air with reduced carbon dioxide near the cathodic component; and
a source of hydrogen gas and an outlet for carbon dioxide and unused hydrogen gas near the anodic component.

* * * * *